United States Patent [19]
Gazzoni

[11] Patent Number: 4,483,768
[45] Date of Patent: Nov. 20, 1984

[54] APPARATUS FOR SEPARATING MATERIALS OF SMALL SIZE

[75] Inventor: Domenico Gazzoni, Como, Italy

[73] Assignee: Sorema S.r.l., Como, Italy

[21] Appl. No.: 262,787

[22] Filed: May 11, 1981

Related U.S. Application Data

[63] Continuation-in-part of Ser. No. 083,761, Oct. 11, 1979, abandoned, which is a continuation of Ser. No. 916,726, Jun. 19, 1978, abandoned.

[51] Int. Cl.$^3$ .............................................. B03B 5/62
[52] U.S. Cl. ..................................... 209/18; 209/173; 209/156; 209/157; 209/158; 209/458
[58] Field of Search ...................... 209/3, 18, 172–173, 209/155–162

[56] References Cited

U.S. PATENT DOCUMENTS

| | | | |
|---|---|---|---|
| 1,456,563 | 5/1923 | Noriega | 209/161 |
| 1,989,937 | 2/1935 | Lessing et al. | 209/173 |
| 2,139,047 | 12/1938 | Tromp | 209/172.5 |
| 2,209,618 | 7/1940 | Vogel | 209/173 X |
| 2,465,220 | 3/1949 | Garber et al. | 209/172.5 |
| 2,554,495 | 5/1951 | Key | 209/173 |
| 2,606,660 | 8/1952 | Klepetko et al. | 209/173 |
| 2,711,822 | 6/1955 | Novak | 209/173 X |
| 2,906,401 | 9/1959 | Katz | 209/159 |
| 3,335,966 | 8/1967 | Haveman | 209/3 X |
| 3,452,862 | 7/1969 | Amadon et al. | 209/173 X |
| 3,485,534 | 12/1969 | Wanzenberg et al. | 406/109 |
| 4,000,031 | 12/1976 | Acobas | 209/3 X |

FOREIGN PATENT DOCUMENTS

| | | | |
|---|---|---|---|
| 2803164 | 8/1978 | Fed. Rep. of Germany | 209/162 |
| 39464 | 9/1972 | Japan | 209/173 |
| 325031 | 2/1930 | United Kingdom | . |
| 415881 | 9/1934 | United Kingdom | . |
| 824658 | 12/1959 | United Kingdom | . |
| 892315 | 3/1962 | United Kingdom | . |
| 1298834 | 12/1972 | United Kingdom | . |
| 1458554 | 12/1976 | United Kingdom | . |

Primary Examiner—Ralph J. Hill
Attorney, Agent, or Firm—Stevens, Davis, Miller & Mosher

[57] ABSTRACT

This invention relates to an apparatus for separating materials of small size. The apparatus according to the invention comprises a separation tub which can be filled with a liquid up to a preselected level, means for introducing a conveying liquid with the materials to be separated into the tub below said preselected level under a pressure which is higher than that existing the area of introduction due to the effect of the weight of the liquid in the tub, and first and second material-ejection means arranged at said preselected level and, respectively, at the tub bottom to eject lighter and, respectively, heavier material.

5 Claims, 9 Drawing Figures

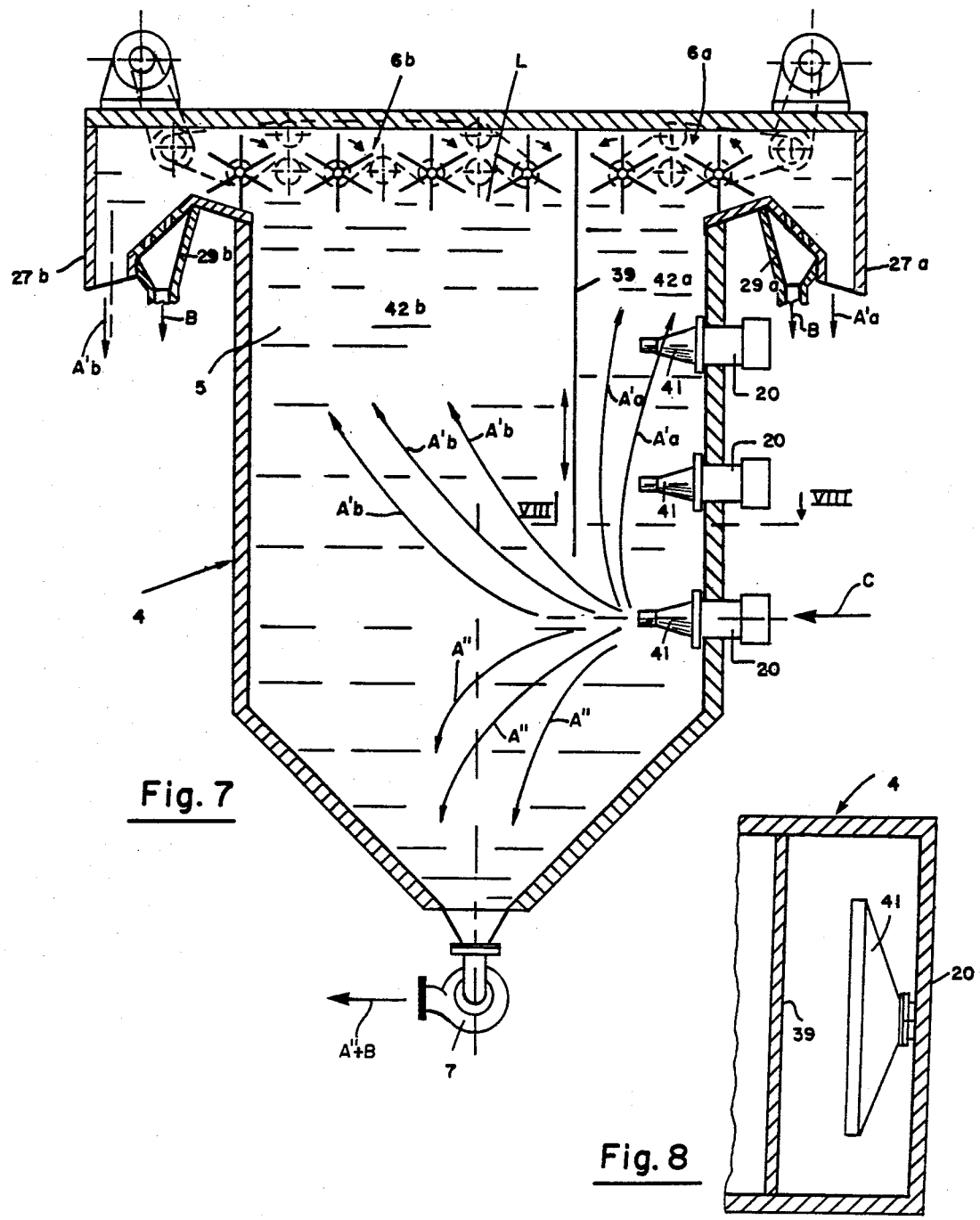

APPARATUS FOR SEPARATING MATERIALS OF SMALL SIZE

This is a continuation-in-part application of my copending application Ser. No. 083,761 of Oct. 11, 1979, now abandoned, which is in turn a continuation application of the original application Ser. No. 916,726 of June 19, 1978, which is now abandoned.

This invention relates to an apparatus for separating materials of a small size.

There are many cases in which materials of a various nature in small pieces or leaves are conveyed along a treatment plant using water or another appropriate liquor as the conveying fluid.

This occurs more particularly at the outlet of washing stations of materials, such as installations for the regeneration of olefinic plastics materials.

An object of the present invention is to provide an apparatus which permits to separate such materials according to their properties, by achieving, more particularly, a differential separation of the materials as a function of their specific gravity.

According to the invention, such an object is achieved by means of an apparatus comprising a mixing device fed with the materials to be separated and a conveying liquid to produce a mixture thereof, a separation tub which can be filled up to a preselected level with a liquid equal to said conveying liquid, variable-delivery pump means for pumping said mixture from said device to an introduction area of said tub below said preselected level at a pressure higher than that due to the weight of the liquid in the tub at said introduction area, first material-ejecting means arranged at said preselected level to urge out of the tub a lighter specific gravity material which has ascended to said preselected level of the liquid and second material-ejecting means arranged at the bottom of the tub to urge out of the tub a heavier specific gravity material which has descended to the tub bottom.

The apparatus according to the invention is based substantially on the fact that, by introducing materials to be separated in the interior of a liquid mass in a tub, the material having a specific gravity lighter than that of the liquid tends to rise towards the free level of the liquid surface and to float thereon, whereas the material having a specific gravity heavier than that of the liquid tends to settle on the bottom of the tub. Appropriate ejection means arranged at the top and the bottom of the tub will then provide to urge the separated materials out of the tub.

It is however to be noted that the most important feature of the apparatus according to the invention consists in that the materials are not directly introduced into the separation tub, but they are firstly mixed with a conveying liquid and then the mixture is forced into the liquid mass in the separation tub by variable-delivery pumping means, which can be selected and adjusted to generate any suitable mixture pressure according to the weight of the materials to be separated. This allows the apparatus of the present invention to operate very well with both heavy and light materials, which feature is particularly interesting in connection with the separation of some very light materials, such as olefinic plastics materials recovered by a trash treatment apparatus.

The above indicated and other features of the present invention will become more clearly apparent from the following detailed description of some embodiments of the invention as shown by way of example only and without limitation in the accompanying drawings.

In the drawings:

FIG. 1 diagrammatically shows an apparatus according to the invention;

FIGS. 5 to 7 show other embodiments of the separation tub, as viewed similarly to FIG. 2;

FIG. 8 shows a detail of the separation tub of FIG. 7, as sectioned along line VIII—VIII of FIG. 7.

Figure 1:
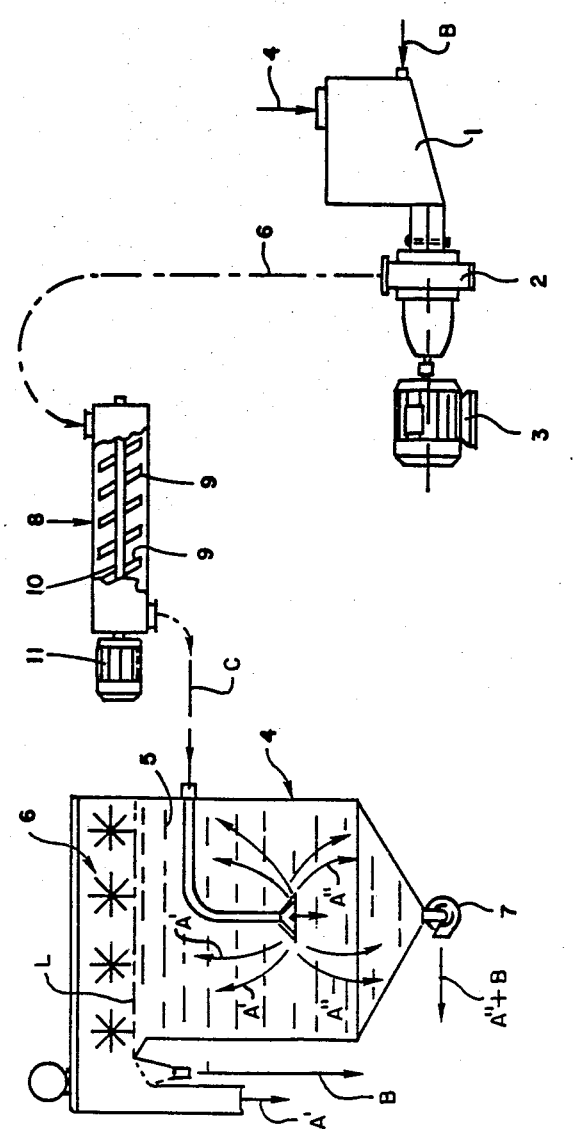

The apparatus shown in FIG. 1 generally comprises a mixing device 1, in which the materials to be separated (arrow A) are mixed with a conveying liquid (arrow B), for example water.

A variable-delivery pump 2 driven by a motor 3 pumps the mixture (arrow C) from the mixing device 1 to a separation tub 4, which, in use, is filled up to a preselected level L with a liquid 5 equal to said conveying liquid. The introduction of the mixture occurs in an introduction area of the tub at a level lower than said preselected level and the pump 2 is adjusted to feed the mixture at a pressure higher than that due to the weight of the liquid in the introduction area of the tub.

The materials (A) are thus allowed to separate from each other according to their specific gravity, that is the lighter material (A') rises towards the liquid level in the tub and floats thereover and the heavier material (A") lowers towards the tub bottom. First and second material-ejecting means 6 and 7 urge the separated materials out of the tub.

A washing device 8 provided with a plurality of beating vanes 9 on a rotating shaft 10 driven by a motor 11 is interposed between the pump 2 and the separation tub 4 with the purpose of mechanically detaching materials possibly joined to each other.

It is thus made easier for the separation tub to separate the materials according to their specific gravity.

Within the scope of the claimed invention, one or another of a number of different embodiments of the separation tub may be included in the apparatus as a function of the several employment requirements. The separation tub may thus be more or less complicated, adapted to separate two or more materials, capable of a higher or lower rate of production and so on. By way of example, some of them are shown in FIGS. 2 to 8 and will be described in detail hereinbelow.

Figure 4:
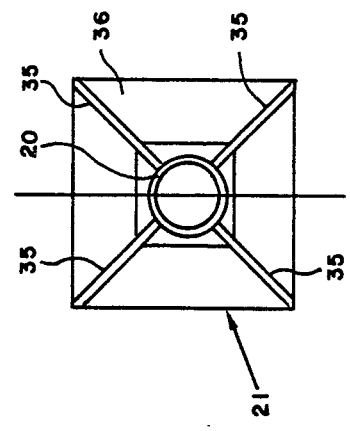
FIG. 4 shows a detail of the separation tub of FIGS. 2 and 3, as sectioned along the line IV—IV of FIG. 2.
Figure 2:
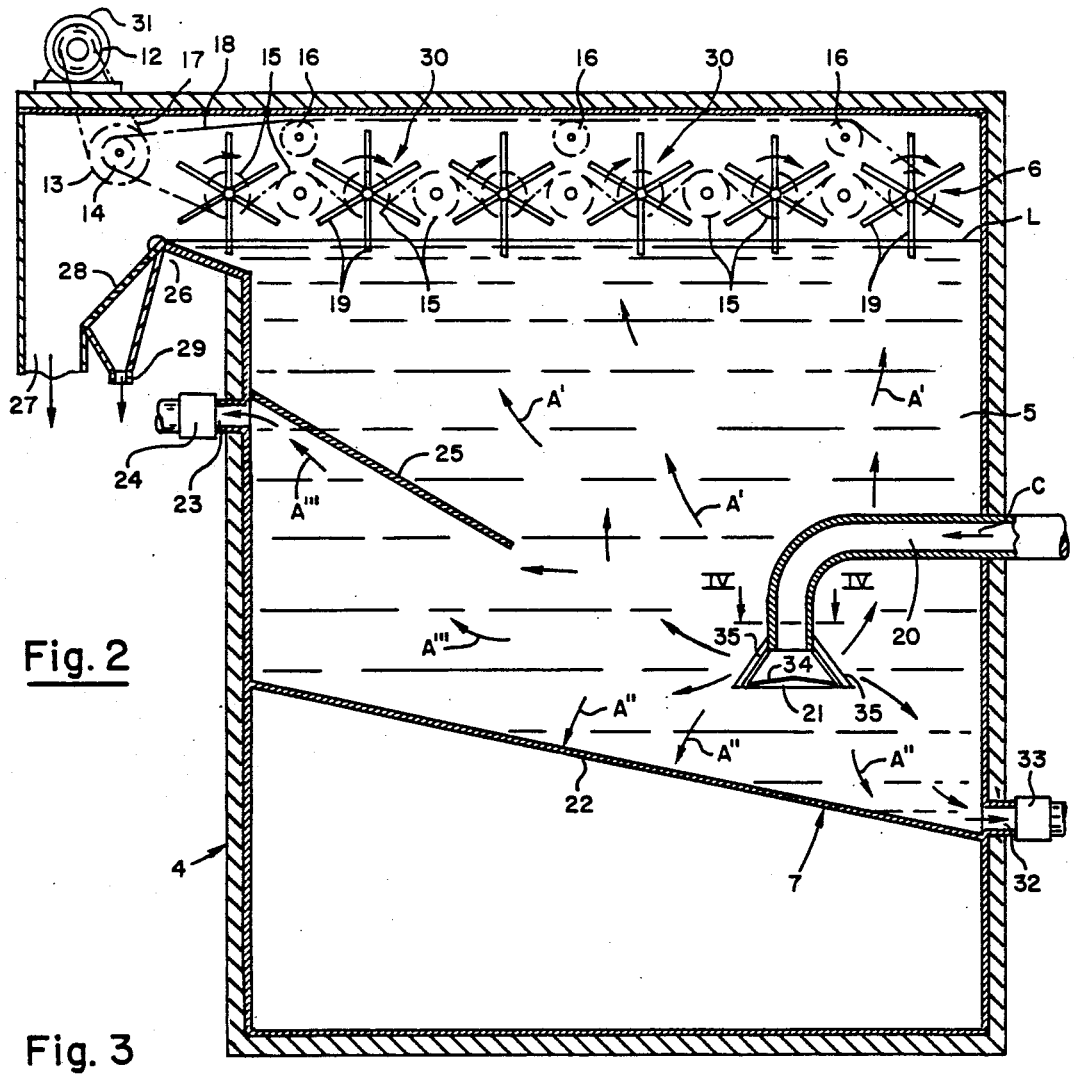
FIG. 2 shows in enlarged scale an embodiment of the separation tub included in the apparatus according to the invention, as sectioned along the line II—II of FIG. 3.
Figure 3:
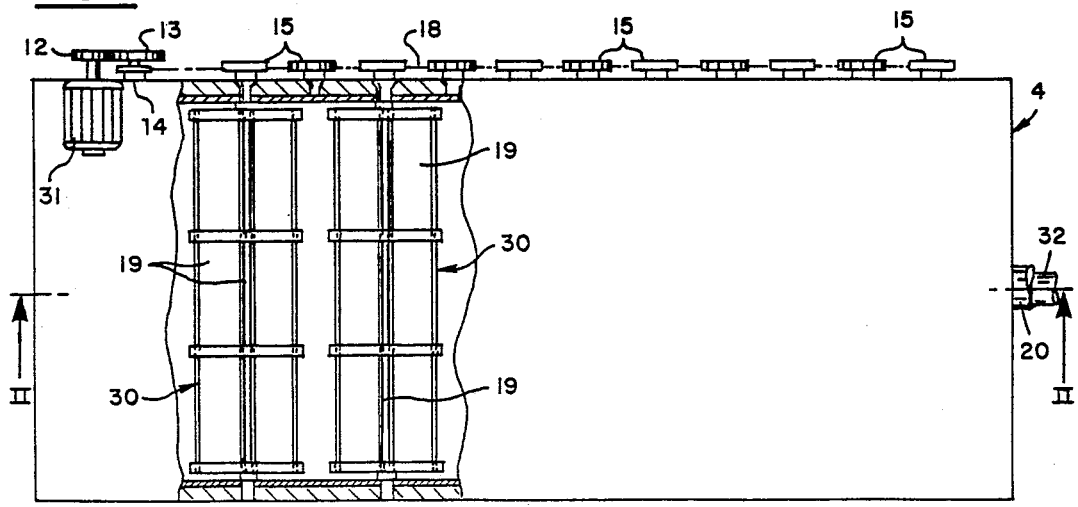
FIG. 3 shows the separation tub of FIG. 2 in top plan view, partly in section.

A first embodiment of the separation tub 4 is shown in FIGS. 2 to 4 and provides for the ejection of the heavier material along an inclined bottom wall 22, which slopes towards a bottom discharge duct 32 equipped with a control valve 33. The inclined wall 22 and the valve 33 represent the heavier material ejecting system 7 of FIG. 1.

The tub is intended for being filled with liquid 5 up to a preselected level L flush with the lower edge of a top discharge port 26. The latter, in its turn, communicates with a material discharging duct 27 and, through a grid 28, with a liquid discharging duct 29.

In the top portion of the tub, above the liquid level L, there is arranged the lighter material ejecting system 6, which comprises in this case a plurality of rollers 30 fitted with paddles 19 and rotatably supported by opposite sidewalls of the tub. The rollers 30 are synchronously rotated by an electric motor 31 through sprockets 12 to 16 and chains 17 and 18. As shown in FIG. 2, the paddle rollers 30 are so arranged that their paddles 19 are capable of dipping by a reduced extent into the liquid 5.

The mixture formed by the materials to be separated and the conveying liquid is introduced into the tub through an inlet duct 20 equipped with an end jet breaker 21 arranged at a level below the preselected level L. The jet breaker 21 is shown in detail in FIG. 4 and comprises a base plate 34 having a pyramidal central portion connected to the duct 20 by brackets 35.

As previously described, the mixture is fed to the inlet duct 20 by the pump 2 at a selected pressure, which is higher than that existing in the inlet area due to the effect of the weight of the liquid 5 in the tub. This is essential in order to allow the mixture C, particularly if including light plastics materials to enter the separation tub below the liquid level.

At a height intermediate between the preselected level L and the introduction area as represented by the jet breaker 21 there is arranged, lastly, an additional discharge duct 23, having a control valve 24, in front of which a sloping baffle 25 is arranged.

In operation, when the mixture (C) of the conveying liquid and the materials to be separated is forced by the pump 2 into the liquid mass 5 through the inlet duct 20 and the jet breaker 21, the materials (A) take different directions according to their specific gravity.

More precisely, the material (A') having a specific gravity lighter than that of the liquid 5 in the tub 4 goes up towards the free surface of the liquid until floating thereon. The paddled rollers 30 of the lighter material ejecting system 6 then provide to urge the material out of the tub towards the discharging duct 27 together with a small amount of liquid, which is discharged, in its turn, through the duct 29 after having been passed through the small bores of the grid 28.

On the contrary, the material (A") having a specific gravity heavier than that of the liquid 5 tends to settle on the inclined bottom wall 22 of the tub, wherefrom it can be discharged by opening the discharge duct 32 by means of the valve 33. Suitable conveying means could be arranged at the tub bottom to make easier the discharge of the heavier material, which is anyhow urged out by the hydraulic thrust of the liquid mass 5. Moreover, a small settling tank or another grid is arranged downstream of the valve 33 to separate the material from the liquid entrained thereby.

Lastly, the possibility is provided for discharging also the possible "indifferent" material (A'''), that is the material which has a specific gravity substantially equal to that of the liquid mass. This is obtained by opening the discharge duct 23, to which such indifferent material is conveyed by the baffle 25.

It should be noted that the separation tub of FIGS. 2 to 4, as included in an apparatus as shown in FIG. 1, lends itself equally well for many types of materials to be separated. A ready adaptation in that direction can be made, in fact, by properly selecting, in addition to the delivery pressure of the pump 2, the height of the introduction area, i.e. of the jet breaker 21, with respect to the preselected level L of the liquid mass 5 in the tub.

Many systems for easily varying the height of the introduction area could be used and will appear promptly available to those skilled in the art. A suitable system could be, for example, that used in the further embodiment of the separation tub, which is shown in FIG. 5 and will be described hereinbelow.

Figure 5:
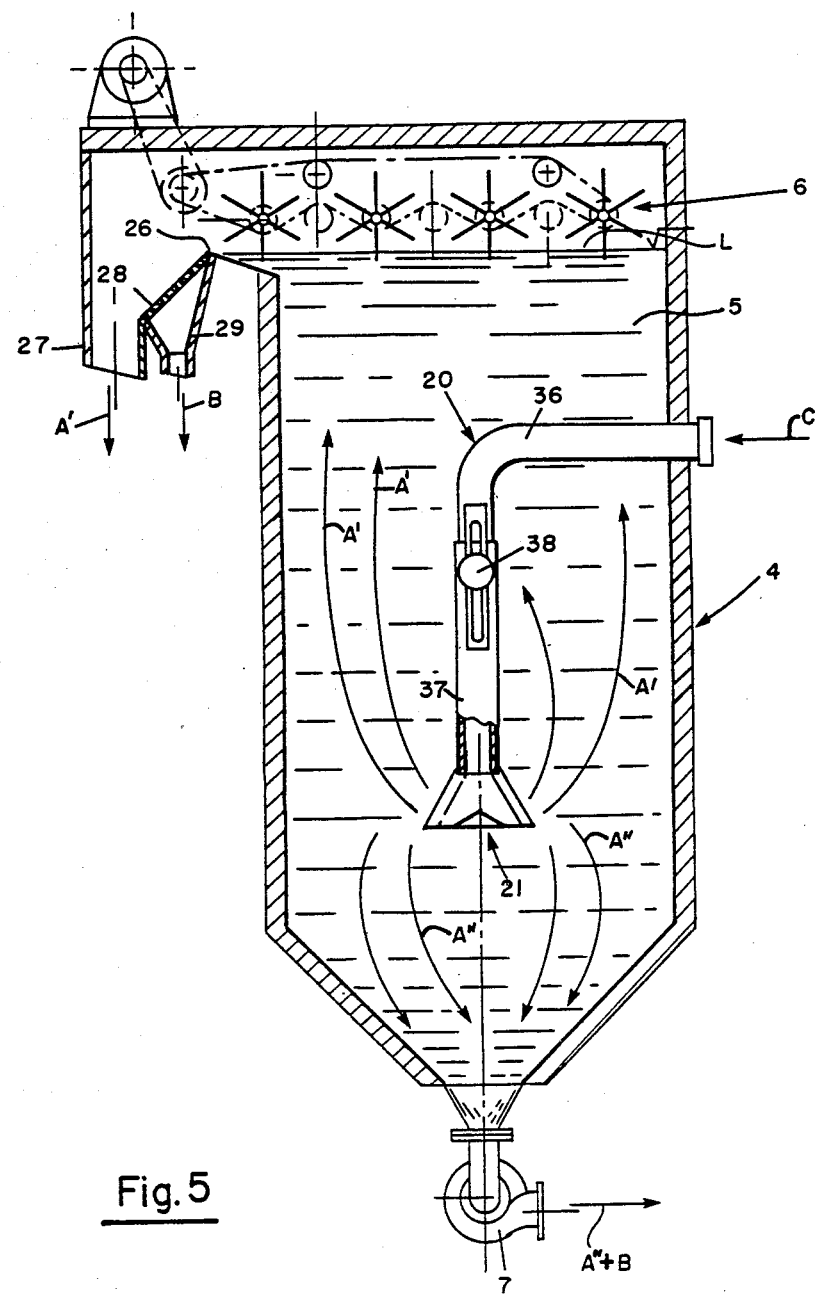

The separation tub illustrated in FIG. 5 is of the kind represented in FIG. 1 and substantially differs from that of FIGS. 2 to 4 merely in having a heavier material ejecting system 7 constituted by a variable delivery pump arranged below a tapered bottom of the tub. In addition, no discharge system for possible "indifferent" material is provided.

As regards the adjustment of the height of the introduction area, it can be seen that the inlet duct 20 (the same reference numbers are used for members similar to those of the separation tub of FIGS. 2 to 4) is formed by two telescopic portions 36 and 37, which can be locked with respect to one another at any suitable position by means of a bolt 38.

The separation tub of FIG. 5 operates similarly to that of FIGS. 2 to 4, but the variable-delivery pump 7 increases the rate of production of the tub and makes it possible to adjust the discrimination of the tub to such a value that only extremely light materials are allowed to go up and to float over the preselected level L. This adjustment can be made by properly selecting the rotating speed of the two pumps 2 and 7.

Figure 6:
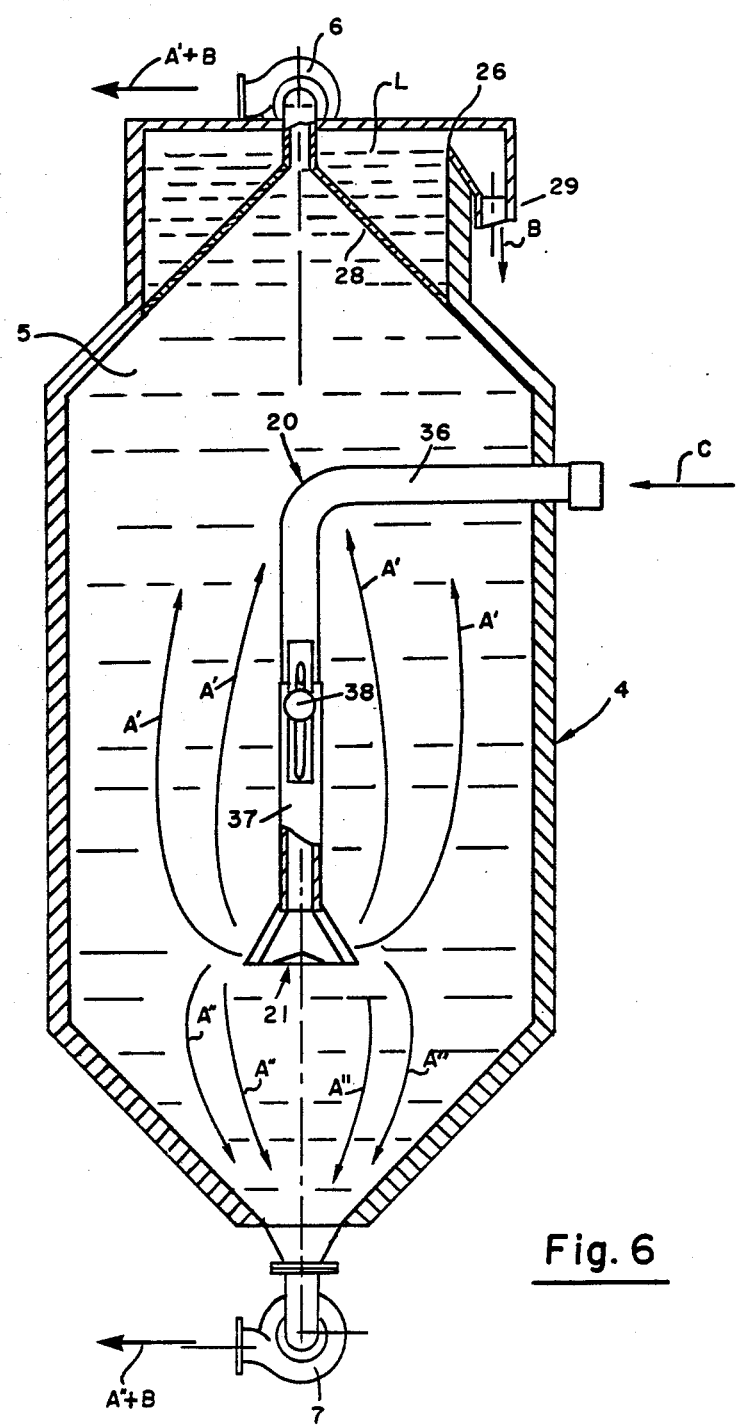

The separation tub of FIG. 6, in its turn, differs from that of FIG. 5 only in that a further variable-delivery pump arranged at the top of the tub is used as lighter material ejecting system 6. A grid 28 avoids the material to reach the liquid discharging duct 29 through the discharge port 26. It is apparent that the substitution of the pump 6 for the paddle system of FIG. 5 increases the rate of extraction of the lighter material, so that the rate of production of the tub correspondingly increases.

The separation tub of FIG. 7 is of the same kind of that shown in FIG. 5, but has its inner space divided by a downwardly extending variable-height partitioning wall 39 into two adjacent parts 42a, 42b, at the top of which there are provided two paddle ejecting systems 6a, 6b, which urge materials and liquid towards respective material discharging ducts 27a, 27b, and liquid discharging ducts 29a, 29b. In addition, the inlet duct 20 of FIG. 5 is replaced by a plurality of selectable inlet ducts 20, which are arranged at different heights and are provided with respective flattened, enlarged end mouths 41 (FIG. 8). The selection of the height of the inlet duct 20 is made according to the specific gravity of the materials to be separated and the height of the partitioning wall 39 is adjusted accordingly.

The separation tub of FIGS. 7 and 8 is thus made capable of separating materials of three different specific gravities, more precisely two light materials (A'a, A'b) and one heavy material (A"). A very light material (A'a) starts rising upstream of the partitioning wall 39 and is urged out by the ejecting system 6a, while a light material (A'b) starts rising downstream of the partitioning wall 39 and is urged out by the ejecting system 6b. The heavy material (A"), in its turn, descends towards the tub bottom and is urged out by the pump 7.

Figure 9:
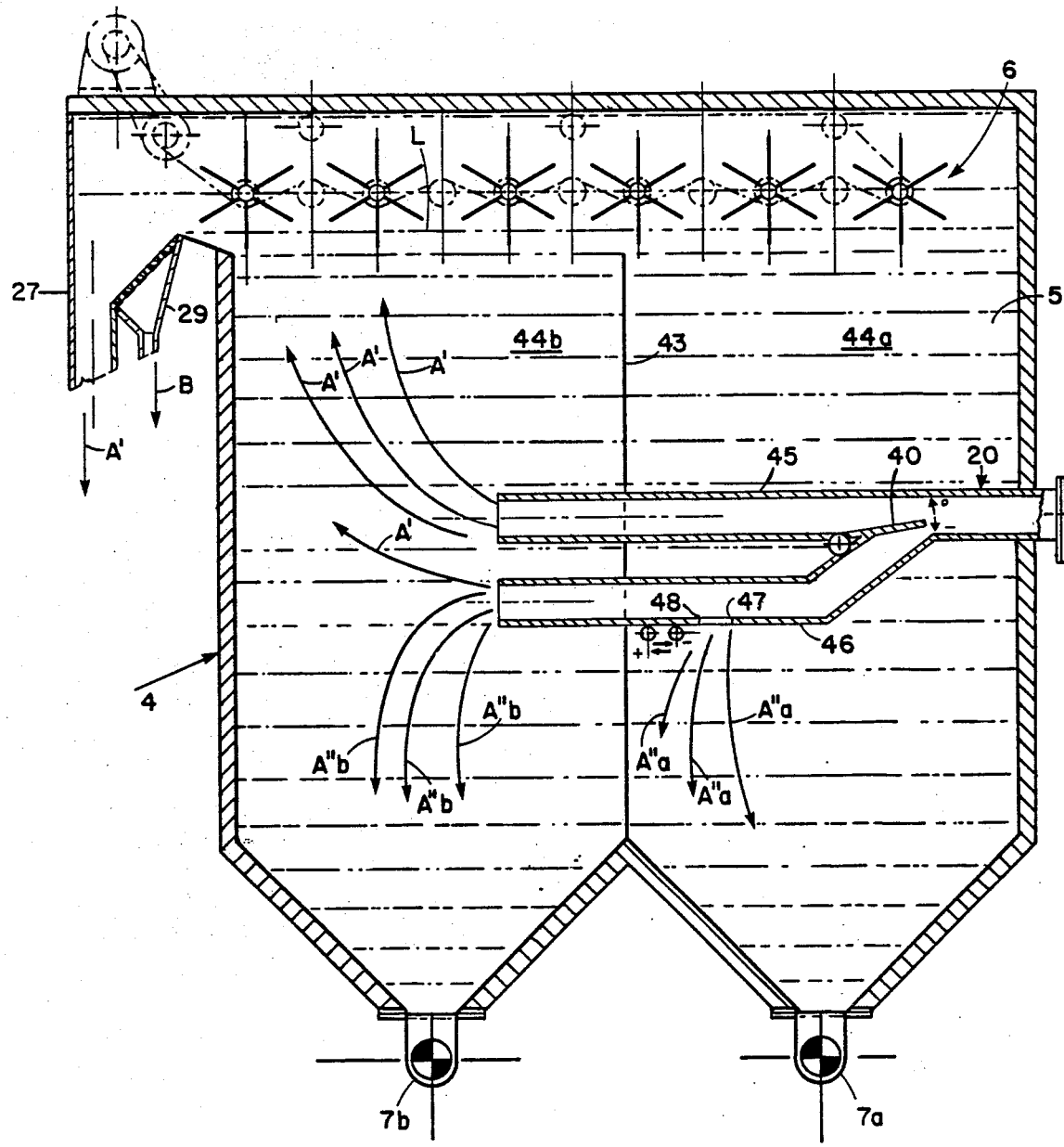
FIG. 9 shows a further embodiment of the separation tub, as viewed similarly to FIGS. 2 and 5 to 7.

The separation tub of FIG. 9 also is able to separate materials of three different specific gravities, but they are one light material (A') and two heavy materials (A"a, A"b). At this end, the tub has its inner space divided by an upwardly-extending partitioning wall 43 into two parts 44a, 44b, at the bottom of which there are provided respective heavy material ejecting pumps 7a, 7b. One paddle ejected system 6 is arranged, on the contrary, at the top of the two tub parts 44a, 44b and urges the light material and the liquid therewith towards a material discharging duct 27 and a liquid discharging duct 29.

The inlet duct divides into higher and lower conduits 45, 46, the inlet of which is controlled by a rotating wall 40. The lower conduit 46 is further provided with a bottom window 47 which opens in the tub part 44a under the control of a slidable wall 48. Both conduits 45 and 46 finally open in the tub part 44b.

In operation, the light material (A') enters almost exclusively the upper conduit 45 and reaches the tub space 44b, where it rises towards the liquid level L and is urged out by the paddle system 6. The two heavy materials (a very heavy material A"a and a heavy material A"b) enter, in turn, the lower conduit 46, but only the heavy material A"b reaches the tub space 44b and is urged out by the pump 7b; the very heavy material A"a, on the contrary, falls through the window 47 in the tub space 44a and is urged out by the pump 7a.

The position of the rotatable wall 40 and that of the slidable wall 48 are obviously selected according to the weight of the materials to be separated.

Suitable means could also be provided in order to allow selection of different heights for the inlet duct 20 and the conduits 45 and 46 according to the weight of the materials.

The several separation tubs shown in FIGS. 2 to 9 can obviously be chosen according to the operation requirements of the apparatus which should comprise them. It is also possible that the apparatus does not comprise only a single stage as shown in FIG. 1, but it is formed on the contrary by a plurality of serially connected stages, each of which includes a variable-delivery pump and a separation tub; in the latter case, one stage could include one kind of separation tub and the subsequent ones could include different kinds of tubs. Every combination should be considered as included in the field of the present invention.

I claim:

1. An apparatus for separating materials of a small size, comprising a mixing device fed with said materials and a conveying liquid to produce a mixture thereof, a separation tub which can be filled up to a preselected level with a liquid equal to said conveying liquid, variable-delivery pump means for pumping said mixture from said device to an introduction area of said tub below said preselected level at a pressure higher than that due to the weight of the liquid in the tub at said introduction area, first material-ejecting means arranged at said preselected level to urge out of the tub a lighter specific gravity material which has ascended to said preselected level of the liquid and second material-ejecting means arranged at the bottom of the tub to urge out of the tub a heavier specific gravity material which has descended to the tub bottom, said introduction area of the separation tub including a mixture inlet duct connected to the outlet of said pump means, there being provided means for varying the height of said inlet duct according to the weight of the materials to be separated, said separation tub having its inner space divided into two parts by a partitioning wall extending downwards from the top of the tub before said inlet tub, said parts of the tub space being provided with respective light material ejecting means for urging out respective light materials of different specific gravities ascended to said preselected level of the liquid upstream and downstream of said partitioning wall, respectively.

2. An apparatus according to claim 1, wherein said inlet duct is provided with a flattened end mouth.

3. An apparatus for separating materials of a small size, comprising a mixing device fed with said materials and a conveying liquid to produce a mixture thereof, a separation tub which can be filled up to a preselected level with a liquid equal to said conveying liquid, variable-delivery pump means for pumping said mixture from said device to an introduction area of said tub below said preselected level at a pressure higher than that due to the weight of the liquid in the tub at said introduction area, first material-ejecting means arranged at said preselected level to urge out of the tub a lighter specific gravity material which has ascended to said preselected level of the liquid and second material-ejecting means arranged at the bottom of the tub to urge out of the tub a heavier specific gravity material which has descended to the tub bottom, said introduction area of the separation tub including a mixture inlet duct connected to the outlet of said pump means, there being provided means for varying the height of said inlet duct according to the weight of the materials to be separated, said separation tub having its inner space divided into two parts by a partitioning wall extending upwards from the bottom of the tub, said inlet duct diverging into higher and lower conduits passing through one of said parts of the tub space and having an open end mouth in the other part of the tub space, the lower conduit having a window opening in said one part of the tub space, and said parts of the tub space being provided with respective heavy-material ejecting means for urging out respective heavy materials of different specific gravity descended to the bottom of the tub upstream and downstream of said partitioning wall.

4. An apparatus according to claim 3, wherein there are provided valve means for controlling the partition of the incoming mixture into said conduits.

5. An apparatus according to claim 3, wherein there are provided valve means for controlling the opening of said window in the lower conduit.

* * * * *